(No Model.)
A. KITSON.
CARBURETING LAMP.
No. 370,341. Patented Sept. 20, 1887.
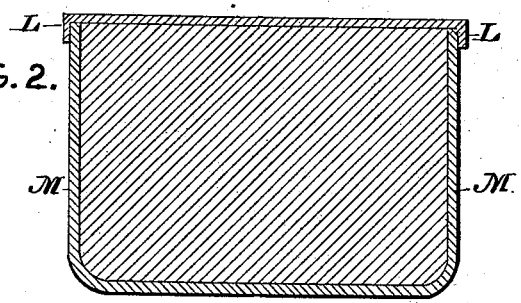
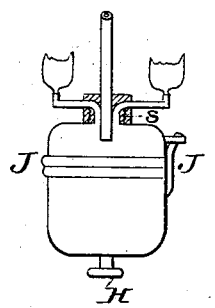
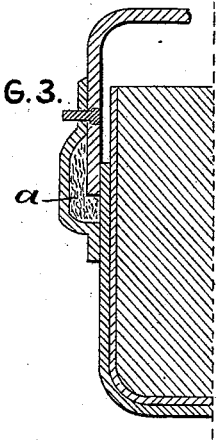
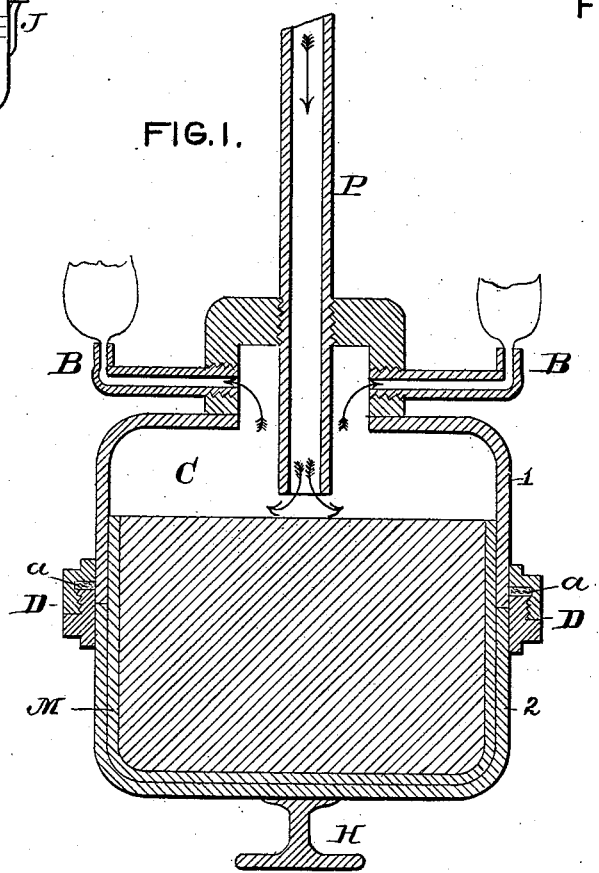
ATTEST.
J. Henry Kaiser.
Victor J. Evans.
INVENTOR
Arthur Kitson.

United States Patent Office.

ARTHUR KITSON, OF PHILADELPHIA, PENNSYLVANIA.

CARBURETING-LAMP.

SPECIFICATION forming part of Letters Patent No. 370,341, dated September 20, 1887.

Application filed May 10, 1887. Serial No. 237,782. (No model.)

*To all whom it may concern:*

Be it known that I, ARTHUR KITSON, a subject of the Queen of Great Britain, residing at Philadelphia, in the county of Philadelphia and State of Pennsylvania, have invented a certain new and useful Improvement in Carbureting-Lamps, by which carbureting gas-lamps may be filled and replenished with enriching material from time to time with greater ease and speed than heretofore, and by which the unpleasant odor arising from the material is prevented; and I do hereby declare that the following is a full, clear, and exact description of the invention, which will enable others skilled in the art to which it appertains to make and use the same.

Heretofore carburetors for gas-lamps have been constructed with one hole in the top, or with one or more holes in the sides, and closed by means of screw-caps. These holes have been usually from one-half inch to one inch in diameter, and used for pouring the enriching material into the vessels. The material has heretofore been prepared in either granules, powder, or in candle form. The task of filling the vessels has therefore been tedious and troublesome. Moreover, the odor arising from the material has to a great extent prevented the adoption of this form of gas-lamp in private houses, churches, &c. My invention overcomes these evils. It also prevents accumulation of dirt in the vessels, and the vessels require filling less often.

Figure 1 shows an ordinary carbureting gas-lamp with my improved vessel C attached. This vessel I construct in two halves, the lower half being detachable from the upper half by means of a screwed joint, D. I do not, however, confine myself to this construction. In some cases I use a bayonet-catch, (shown at Fig. 3,) causing the lower half to hold to the upper. I can also use a hinged joint, as shown at Fig. 4, and allow the vessel to be opened and closed by such means.

Referring, however, to Fig. 1, P is a supply-pipe, B burners. C is the vessel divided in the halves 1 and 2. D is the screwed joint. The screwed part rigidly secured to the lower half of vessel engages a corresponding screwed part, which is rigidly secured to upper half. To make a perfect joint and prevent escape around the lower half, I insert an asbestus washer, a, in hollowed part of upper piece. Against this washer the edge of the screwed part of lower half of vessel bears. The joint thus becomes gas-tight. I also attach a handle, H, to lower half, by means of which the lower half may be readily attached. In some cases it may be preferable to detach the vessel entire from the fixture. In this case I arrange a screwed joint at S and a hinged joint, J, as shown in Fig. 4. The vessel may be unscrewed by the handle and filled by opening at the hinged joint. It is obvious the vessel may be divided in any other proportion, as shown in Fig. 4, the joint being near the top.

The second part of my invention, and part of my method, consists in preparing the hydrocarbon in molds of sizes rather smaller than the carbureting-vessels, and sufficient to nearly fill the entire vessel. These molds can be made of any suitable material—such as tin, pasteboard, wood, paper, &c. After melting the material it is poured into the mold. A lid is provided and placed on the top of mold as soon as the material has cooled and solidified.

Fig. 2 shows a mold, M, with lid L, containing enriching material. In this form it may be carried anywhere without producing the slightest odor. When it is necessary to fill the carbureting-vessel, the lower half is detached and one of the molds inserted. The lid L is taken off from the mold to enable the gas of the lamp to come in contact with the material in mold. The lower half of the vessel is then replaced. For refilling the vessel the mold is lifted out of vessel and another inserted. By this means vessels can be kept free from dirt, and may be replenished instantly without liability of spilling material or causing unpleasant odors. By pouring the material in a liquid condition and allowing it to solidify in mold, as described, it forms a compact mass, and a larger quantity can be inserted than when run in in loose granular form. The molds are made of any form, and adapted to those of the carbureting-vessels. If the vessels are wholly detached from the fixtures, the filling is done by opening the vessel by hinged joint and inserting the mold from the top. In Fig. 1 the vessel is shown with the mold inserted.

What I claim as novel, and desire to secure by Letters Patent, is—

In a carbureting gas-lamp, the combination, with a gas-supply pipe and gas-burners, of a carbureting-vessel sectionally constructed in two parts, one part being readily detachable from the other, and a receptacle for solid hydrocarbon, substantially as described.

ARTHUR KITSON.

Witnesses:
SAMUEL CROWTHER,
THOMAS EVANS.